(12) United States Patent
Tanaka et al.

(10) Patent No.: US 6,426,609 B2
(45) Date of Patent: Jul. 30, 2002

(54) CONTROL DEVICE FOR VEHICULAR AC GENERATOR, AND CONNECTOR

(75) Inventors: Koji Tanaka, Anjo; Makoto Taniguchi, Kariya; Takeshi Sada, Toyota, all of (JP)

(73) Assignee: Denso Corporation, Kariya (JP)

( * ) Notice: Subject to any disclaimer, the term of this patent is extended or adjusted under 35 U.S.C. 154(b) by 55 days.

(21) Appl. No.: 09/742,292

(22) Filed: Dec. 22, 2000

(30) Foreign Application Priority Data

Dec. 24, 1999 (JP) .......................................... 11-367125
Mar. 23, 2000 (JP) ...................................... 2000-081610

(51) Int. Cl.[7] .............................................. H02P 9/10
(52) U.S. Cl. ............................... 322/19; 322/29; 322/59
(58) Field of Search ................................ 322/19, 18, 27, 322/28, 29, 59

(56) References Cited

U.S. PATENT DOCUMENTS

| 4,520,272 A | | 5/1985 | Danno et al. .............. 290/40 A |
| 4,608,639 A | * | 8/1986 | Morishita et al. ............ 320/164 |
| 4,636,706 A | | 1/1987 | Bowman et al. ............... 322/28 |
| 4,651,081 A | * | 3/1987 | Nishimura et al. .......... 320/123 |
| 4,689,545 A | * | 8/1987 | Komurasaki et al. ........ 320/123 |
| 5,280,231 A | * | 1/1994 | Kato et al. ................... 320/155 |
| 5,352,971 A | | 10/1994 | Nishimura .................... 322/27 |
| 5,703,472 A | * | 12/1997 | Aoyama et al. ............... 322/28 |
| 5,719,485 A | * | 2/1998 | Asada .......................... 322/24 |
| 2002/0000791 A1 | * | 1/2002 | Taniguchi et al. ............. 322/28 |

FOREIGN PATENT DOCUMENTS

| EP | 0 299 807 A2 | 1/1989 |
| JP | 54-7111 | 1/1979 |
| JP | 60-87636 | 5/1985 |
| JP | 62-89499 | 4/1987 |
| JP | 62-894498 | 4/1987 |
| JP | 04312326 | 11/1992 |
| JP | 5-176599 | 7/1993 |
| JP | 6-55040 | 7/1994 |
| JP | 06189600 | 7/1994 |
| JP | 6-67134 | 8/1994 |
| JP | 8-140284 | 5/1996 |
| JP | 9-327199 | 12/1997 |

* cited by examiner

*Primary Examiner*—Nicholas Ponomarenko
(74) *Attorney, Agent, or Firm*—Oliff & Berridge, PLC

(57) ABSTRACT

A control voltage is set to an acceleration control voltage which is higher than a battery voltage V by a predetermined voltage difference ΔV1 within a range and delayed by a predetermined time ΔT1 during acceleration at low speeds. During acceleration at low speeds, the rotational speed is less than a predetermined value and the rate of increase in rotational speed is equal to or greater than another predetermined value. The range of voltage is higher than battery voltage V and lower than the steady state control voltage of 14.5V.

21 Claims, 11 Drawing Sheets

DECELERATION

ACCELERATION

CONTROL DEVICE FOR VEHICULAR AC GENERATOR, AND CONNECTOR

CROSS-REFERENCE TO RELATED APPLICATION

The present invention is related to Japanese patent application No. Hei. 11-367125, filed Dec. 24, 1999; 2000-81610, filed Mar. 23, 2000 the contents of which are incorporated herein by reference.

FIELD OF THE INVENTION

The present invention relates to a motor vehicle alternator, and more particularly, to a motor vehicle alternator that prevents hunting of the rotational speed of the engine during idle state.

BACKGROUND OF THE INVENTION

A decrease in rotational speed (hereinafter referred to as an idle rotational speed) of a motor vehicle alternator during vehicle idle will cause torque generated by the engine to be reduced. For this reason, the alternator drive torque (hereinafter also referred to as load torque) viewed from the engine will in turn increase due to the connection of an electrical load. For example, a large amount of starting current of a compressor drive motor is used for air conditioning within the vehicle. This will result in a hunting phenomenon in which the idle rotational speed becomes unstable and fluctuates.

Hunting of the rotational speed of the engine can cause the battery voltage to fluctuate more significantly, leading to various abnormal conditions and presenting a difficulty in maintaining idle operation or the like.

To prevent hunting of motor vehicle alternators of this type, various techniques have been conventionally suggested which allow adjustment of the control voltage according to a change in rotational speed.

Japanese Unexamined Patent Publication No. 7111, published 1979, suggested that the control voltage of an alternator should be reduced according to the rate of change in speed (a differential value) during deceleration of the engine (for negative differential values of rotational speed of the engine). On the other hand, during engine acceleration (for positive differential values of rotational speed of the engine), the voltage should be increased according to the rate of change in speed (a differential value).

Japanese Unexamined Patent Publication No. 87636, published 1985, applied for by the present inventor suggested that the amount of generated electricity should be kept below a predetermined value for a certain time during which the idle rotational speed recovered from the point of an increase in electrical load.

Japanese Patent Publication No. 55040 of 1994 applied for by the present inventor suggested that the control voltage should be increased in proportion to the degree of acceleration while increasing the rotational speed of the engine (under acceleration), while being delayed for a predetermined time relative to an increase in rotational speed of the engine.

Japanese Unexamined Patent Publication No. 327199, published 1997, suggested that a target voltage should be set to a certain low value less than a steady state target voltage during engine acceleration. On the other hand, during deceleration of the engine, the target voltage should be set to a certain high value higher than the steady state target voltage.

However, the following problems have been found to occur even with the aforementioned various prior-art techniques. First, these anti-hunting techniques change the control voltage of a regulator according to a change in rotational speed of the engine. Thus, the change of the rotational speed of the engine is associated with the change of the control voltage irrespective of the condition of the electric circuitry comprising the battery, electrical loads, and the alternator. For this reason, the condition of the electric circuitry was not taken into account and therefore the techniques were without validity in some cases. For example, it was not easy to take corrective action appropriately when the battery voltage recovered earlier than expected during acceleration or when the voltage recovered slower than expected due to a deep discharge regardless of substantial completion of acceleration. Furthermore, it was necessary to add signals such as a battery voltage to control parameters in addition to the aforementioned rotational speed of the engine, thus making the circuit processing complicated.

Furthermore, the aforementioned various conventional techniques provided a sudden variation in output or in drive torque (load torque) of the alternator during transitions of the rotational speed of the engine. The transitions include a transition from a steady state mode to a deceleration mode, a transition from the deceleration mode to an acceleration mode, and a transition near the point of completion of the acceleration mode. Such a sudden change in output of the alternator would cause a sudden change in torque and thereby a shock. The change would also readily cause heavy current charging to or heavy current discharging from batteries upon generation of high output, leading to a drop in charging efficiency or an increase in loss of power distribution.

SUMMARY OF THE INVENTION

In a first aspect of the invention, the controller sets the control voltage to an acceleration control voltage higher than the battery voltage by a predetermined voltage difference $\Delta V1$, within a range of voltages higher than the battery voltage and less than the steady state control voltage, during a acceleration during low speeds with the rotational speed being equal to or less than a predetermined value and a rate of increase in the rotational speed being equal to or greater than a predetermined value. This control can be called a mode for supressing rates of increase in battery voltage or a charge supression mode. Control of this type may be executed prior to control which employs the steady state control voltage as a control voltage, thereby preferably realizing control.

That is, according to this control, the control voltage is set higher than the battery voltage by a predetermined voltage difference $\Delta V1$ in the recovery process of the rotational speed of the engine. In this process, the rotational speed of the engine and the battery voltage are decreased due to the connection of electrical loads, and the rotational speed of the engine is increased due to an increase in fuel injection provided subsequently by the engine control system. Also, the predetermined voltage difference $\Delta V1$ ranges from 0.1V to 0.15V, and may be kept at a constant value during acceleration during low speeds. Alternatively, for example, the difference may be increased from the earlier stage to the later stage of acceleration during low speeds.

In another aspect, the control voltage is further set to a deceleration control voltage lower than the battery voltage by a predetermined voltage difference $\Delta V2$. This is carried out after the rotational speed of the engine has decreased below a first predetermined rotational speed value N1 within a period of deceleration during low speeds immediately preceding the aforementioned acceleration during low speeds. The control of this type can be referred to as a battery voltage drop adjustment mode or a discharge suppression mode which means not more than the suppression of discharge of the battery. Moreover, the control is desirably executed prior to the control which employs the steady state control voltage as a control voltage.

The predetermined voltage difference $\Delta V2$ ranges from 0.01V to 0.1V, and may be kept at a constant value during deceleration during low speeds. Alternatively, for example, the difference may be increased being operatively associated with a decrease in rotational speed of the engine or a drop in battery voltage.

That is, this arrangement employs a gradual decrease in control voltage during deceleration. This is carried out at the later stage of during deceleration during low speeds in which a smaller amount of the alternator output and torque produced by the engine is provided. The control voltage is thereby maintained to prevent the battery from being discharged while the rotational speed of the engine has decreased slightly and allowable power generation capacity is available at the earlier stage of during deceleration during low speeds. When the rotational speed of the engine decreases more than this, the control voltage is decreased, being operatively associated with a drop in battery voltage which requests that the battery discharges. Also, this arrangement does not allow the control voltage to be reduced all at once even after the rotational speed of the engine has been decreased below the first predetermined rotational speed value N1. For this reason, the drive torque (load torque) of the alternator will not be suddenly changed.

In another aspect of the invention, the predetermined voltage difference $\Delta V1$, between a voltage given at a minimum rotational speed value Nmin, at which during deceleration during low speeds is shifted to acceleration during low speeds, and a voltage at the subsequent rotational speed of the engine being equal to or greater than a second predetermined rotational speed value N2, is set to a voltage less than the predetermined voltage difference $\Delta V1$ during the subsequent acceleration during low speeds. Accordingly, power generation and charging of the battery are prevented to increase the rotational speed of the engine during the earlier stage in the recovery process of the rotational speed of the engine where the outputs of the engine torque and the alternator are not sufficient. At the same time, a sudden increase in drive torque (load torque) of the alternator viewed from the engine is prevented when during deceleration during low speeds is shifted to acceleration during low speeds. Furthermore, a sudden increase in battery charging current is prevented. This makes it possible to realize a smooth increase in engine load torque.

In another aspect, the controller further allows the predetermined voltage difference $\Delta V1$ to increase at a later stage rather than at an earlier stage of acceleration during low speeds. In another aspect, the control voltage is set to a deceleration control voltage less than the battery voltage by the predetermined voltage difference $\Delta V2$. This is carried out during a period of deceleration during low speeds with the rotational speed, immediately preceding the rotational speed of the engine is increased, being equal to or less than a predetermined value and the rate of decrease in rotational speed being equal to or greater than a predetermined value.

This makes it very possible to prevent a sudden increase in drive torque (load torque) of the alternator viewed from the engine, and the predetermined voltage difference $\Delta V'$ increases at a later stage rather than at an earlier stage of during deceleration during low speeds. Thus, the battery is prevented from being discharged by generating a relatively large amount of power by the alternator. This is done at the earlier stage of acceleration during low speeds with a decrease in rotational speed of the engine being still small. That is, this is done when the engine torque and the output of the alternator are still sufficient. On the other hand, consider the later stage of acceleration during low speeds where a smaller decrease occurs in rotational speed of the engine. that is, this happens when the engine torque and the output of the alternator have become insufficient. In this stage, power generation by the alternator is prevented to compensate for shortage in power by discharging the battery, thereby preventing a sudden decrease of the rotational speed of the engine.

Also, said increasing of the predetermined voltage difference $\Delta V2$ is continuously operatively associated with a decrease in rotational speed of the engine, thereby making it possible to smooth still more the change in drive torque (load torque) of the alternator viewed from the engine.

In another aspect of the invention, the controller for allowing the battery voltage to approach a control voltage includes a first setting means for setting the control voltage to a predetermined steady state control voltage, and second setting means for setting the control voltage to an acceleration control voltage higher than the battery voltage by a predetermined voltage difference $\Delta V1$. This voltage is within a range of voltages higher than the battery voltage and less than the steady state control voltage, during acceleration during low speeds with the rotational speed of the engine being equal to or less than a predetermined value and a rate of increase in the rotational speed being equal to or greater than a predetermined value.

In such an arrangement, when the second setting means employs the acceleration control voltage as the control voltage, more controlled power generation is carried out than when the control voltage is at the steady state control voltage. Consequently, while the battery is being charged, it becomes possible to make the load provided by the alternator to the engine lower than the load provided under the steady state control voltage.

To achieve the aforementioned object, the following method can be employed in a method for controlling a motor vehicle alternator wherein a rotational speed of an engine and a battery voltage are input, and field current is controlled so as to allow the battery voltage to approach a control voltage. That is, the control voltage is set to an acceleration control voltage higher than the battery voltage by a predetermined voltage difference $\Delta V1$, within a range of voltages higher than the battery voltage and less than the steady state control voltage, during a acceleration during low speeds with the rotational speed of the engine being equal to or less than a predetermined value and a rate of increase in the rotational speed being equal to or greater than a predetermined value.

In another aspect of the invention, the resistance potential divider circuit for outputting a plurality of voltages is used to form an acceleration control voltage and a deceleration control voltage. The voltages are then selected by a plurality of switches (an analog multiplexer may also be employed).

In another aspect, the switch control circuit determines which one of the switches is to be selected, according to the rotational speed of the engine sensed according to a voltage of one phase output from an output terminal of the armature coil.

In another aspect of the invention, a delay time in response to control during acceleration during low speeds is made greater than a delay time in response to control during deceleration during low speeds. This prevents a sudden decrease in output current of the alternator during acceleration, or a sudden drop in alternator torque. This makes it possible to avoid sudden charging of the battery during acceleration and provides further improved stability in the rotational speed of the engine.

In another aspect, the control means has a delay circuit for determining a delay time in response to control during acceleration during low speeds. Moreover, the delay circuit is turned off during deceleration during low speeds.

In another aspect of the invention, the controller sets the control voltage to an acceleration control voltage that is higher than the battery voltage by a predetermined voltage difference $\Delta V1$, within a range of voltages higher than the battery voltage and less than the steady state control voltage, during a acceleration during low speeds with the rotational speed being equal to or less than a predetermined value and a rate of increase in the rotational speed being equal to or greater than a predetermined value. This control can be called a mode for suppressing rates of increase in battery voltage or a charge suppression mode. Control of this type may be executed prior to control which employs the steady state control voltage as a control voltage, thereby preferably realizing control.

That is, according to this control, the control voltage is set higher than the battery voltage by a predetermined voltage difference $\Delta V1$ in the recovery process of the rotational speed of the engine. In this process, the rotational speed of the engine and the battery voltage are decreased due to the connection of electrical loads, and the rotational speed of the engine is increased due to an increase in fuel injection provided subsequently by the engine control system. Also, the predetermined voltage difference $\Delta V1$ ranges from 0.1V to 0.15V, and may be kept at a constant value during acceleration during low speeds. Alternatively, for example, the difference may be increased from the earlier stage to the later stage of acceleration during low speeds.

In another aspect, the control voltage is further set to a deceleration control voltage lower than the battery voltage by a predetermined voltage difference $\Delta V2$. This is carried out after the rotational speed of the engine has decreased below a first predetermined rotational speed value N1 within a period of deceleration during low speeds immediately preceding the aforementioned acceleration during low speeds. The control of this type can be referred to as a battery voltage drop adjustment mode or a discharge supression mode which means not more than the control of discharge of the battery. Moreover, the control is desirably executed prior to the control which employs the steady state control voltage as a control voltage. The predetermined voltage difference $\Delta V2$ ranges from 0.1V to 0.15V, and may be kept at a constant value during deceleration during low speeds. Alternatively, for example, the difference may be increased being operatively associated with a decrease in rotational speed of the engine or a drop in battery voltage.

That is, this arrangement employs a gradual decrease in control voltage at the time of deceleration like the acceleration control voltage in the aforementioned claim 1. This is carried out at the later stage of said period of deceleration during low speeds in which a smaller amount of the alternator output and the torque produced by the engine is provided. The control voltage is thereby maintained to prevent the battery from being discharged while the rotational speed of the engine has decreased slightly and allowable power generation capacity is available at the earlier stage of during deceleration during low speeds. When the rotational speed of the engine decreases more than this, the control voltage is decreased, being operatively associated with a drop in battery voltage which requests that the battery discharges. Also, this arrangement does not allow the control voltage to be reduced at once even after the rotational speed of the engine has been decreased below the first predetermined rotational speed value N1. For this reason, the drive torque (load torque) of the alternator will not be suddenly changed.

In another aspect of the invention, the predetermined voltage difference $\Delta V1$, between a voltage given at a minimum rotational speed value Nmin, at which during deceleration during low speeds is shifted to acceleration during low speeds, and a voltage at the subsequent rotational speed of the engine being equal to or greater than a second predetermined rotational speed value N2, is set to a voltage less than the predetermined voltage difference $\Delta V1$ during the subsequent acceleration during low speeds. Accordingly, power generation and charging of the battery are prevented to increase the rotational speed of the engine at the earlier stage in the recovery process of the rotational speed of the engine where the outputs of the engine torque and the alternator are not sufficient. At the same time, a sudden increase in drive torque (load torque) of the alternator viewed from the engine is prevented when during deceleration during low speeds is shifted to acceleration during low speeds. Furthermore, a sudden increase in battery charging current is prevented. This makes it possible to realize a smooth increase in engine load torque.

In another aspect, the control voltage is set to a deceleration control voltage less than the battery voltage by the predetermined voltage difference $\Delta V2$. This is carried out during a period of deceleration during low speeds with the rotational speed, immediately preceding the rotational speed of the engine is increased, being equal to or less than a predetermined value and the rate of decrease in rotational speed being equal to or greater than a predetermined value.

This prevents sudden increase in drive torque (load torque) of the alternator viewed from the engine, and the predetermined voltage difference $\Delta V2$ increases at a later stage rather than at an earlier stage of during deceleration during low speeds. Thus, the battery is prevented from being discharged by generating a relatively large amount of power by the alternator. This is done at the earlier stage of acceleration during low speeds with a drop in rotational speed of the engine being still small. That is, it is done when the engine torque and the output of the alternator are still sufficient. On the other hand, consider the later stage of acceleration during low speeds where a smaller drop occurs in rotational speed of the engine, that is, when the engine torque and the output of the alternator have become insufficient. In this stage, power generation by the alternator is relatively strongly prevented to compensate for shortage in power by discharging the battery, thereby preventing a sudden drop of the rotational speed of the engine.

Here, the controller for allowing the battery voltage to approach a control voltage can be comprised of first setting means for setting the control voltage to a predetermined steady state control voltage, and second setting means for setting the control voltage to an acceleration control voltage higher than the battery voltage by a predetermined voltage difference $\Delta V1$, within a range of voltages higher than the battery voltage and less than the steady state control voltage, during a acceleration during low speeds with the rotational speed of the engine being equal to or less than a predetermined value and a rate of increase in the rotational speed being equal to or greater than a predetermined value.

To achieve the aforementioned object, the following method can be employed in a method for controlling a motor vehicle alternator wherein a rotational speed of an engine and a battery voltage are input, and field current is controlled so as to allow the battery voltage to approach a control voltage. That is, the control voltage is set to an acceleration control voltage higher than the battery voltage by a predetermined voltage difference $\Delta V1$, within a range of voltages higher than the battery voltage and less than the steady state control voltage, during a acceleration during low speeds with the rotational speed of the engine being equal to or less than a predetermined value and a rate of increase in the rotational speed being equal to or greater than a predetermined value.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description. In the drawings:

BRIEF DESCRIPTION OF THE DRAWINGS

The present invention will become more fully understood from the detailed description and the accompanying drawings, wherein.

DETAILED DESCRIPTION OF THE PRESENT INVENTION

Figure 1:
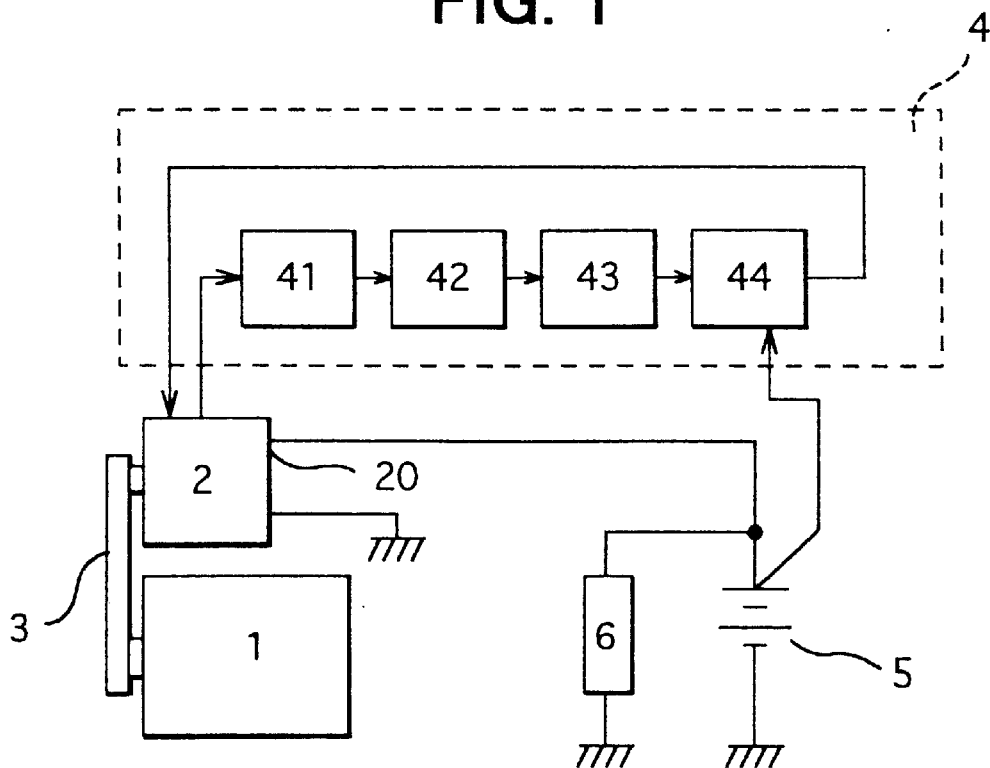
FIG. 1 is a circuit block diagram of a motor vehicle alternator according to a first embodiment of the present invention.

In the embodiments described below, the alternator is adapted to increase the exciting current to raise generator output since the control voltage is a little higher than the battery voltage during acceleration. However, a difference $\Delta V1$ between the battery voltage and the control voltage is small and it takes a predetermined time $\Delta T1$ for the battery voltage to return to the control voltage. For this reason, the battery voltage increases at the rate of increase specified by the predetermined voltage difference $\Delta V1$, the predetermined delay time$\Delta T1$, an increase in alternator output due to an increase in rotational speed of the engine, the performance of the battery, and the magnitude of electrical loads. The aforementioned delay time$\Delta T1$ includes, for example, a delay in response caused by a feedback control system.

Accordingly, a gradual increase in alternator output leads to a gradual increase in battery voltage and in drive torque (load torque) of the alternator viewed from the engine. During the acceleration, that is, during natural recovery of the rotational speed of engine (acceleration during low speeds), no sudden increase will occur in the load torque of the engine. Consequently, after the rotational speed of the engine has recovered to a steady state rotational speed (for example, an idle rotational speed), overshoots of the rotational speed of the engine caused such as by a delay in response of the engine control system will not increase.

After all, the drive torque (load torque) of the alternator viewed from the engine and the overshoot of the rotational speed of the engine can be well prevented.

Shortage in battery charging current (alternator output) is caused by the lack in the alternator output at the final stage of during the aforementioned temporary deceleration that resulted from the connection of electrical loads. The shortage is generally re-charged in the process where the battery voltage recovers from the minimum value thereof at the start of the acceleration during low speeds to the specified steady state target value. However, in the arrangement described above, the alternator output at each point in during the acceleration during low speeds does not increase according to the amount of recovery of the rotational speed of the engine. The alternator output increases according to an increase in control voltage operatively associated with the amount of recovery of the battery voltage. That is, the recovery of the battery voltage. Since the battery is accordingly re-charged, the alternator output can gradually recover from a significant drop thereof according to not only the possible alternator output dependent of the rotational speed of the engine, but also the magnitude of the electrical loads, or the degree of battery discharge. On the other hand, the alternator output can quickly recover from a slight drop thereof. In either case, a sudden recharge of the battery can be avoided. In addition, a sudden increase in drive torque of the alternator (load torque) viewed from the engine, accompanied by a sudden re-charge of the battery (that is, a sudden increase in battery voltage) which would last until the battery is completely re-charged can be avoided. Thus, a smooth increase in the drive torque (load torque) of the alternator viewed from the engine can be realized.

The aforementioned hunting phenomenon will be explained below in more detail.

Connection of an electrical load at rotational speeds during idle operation can cause an increase in load torque of the engine, thereby reducing the rotational speed of the engine below the rotational speed for idle operation. Thereafter, the rotational speed of the engine will be increased by constant rotational speed control for idle operation by means of an engine controller. Then, the rotational speed of the engine will exceed the rotational speed for idle operation. The engine controller will sense the excess of the rotational speed of the engine to thereby reduce the rotational speed of the engine. Thus, the rotational speed of the engine will repeatedly fluctuate as such, ultimately converging gradually at the rotational speed for idle operation.

Figure 18:
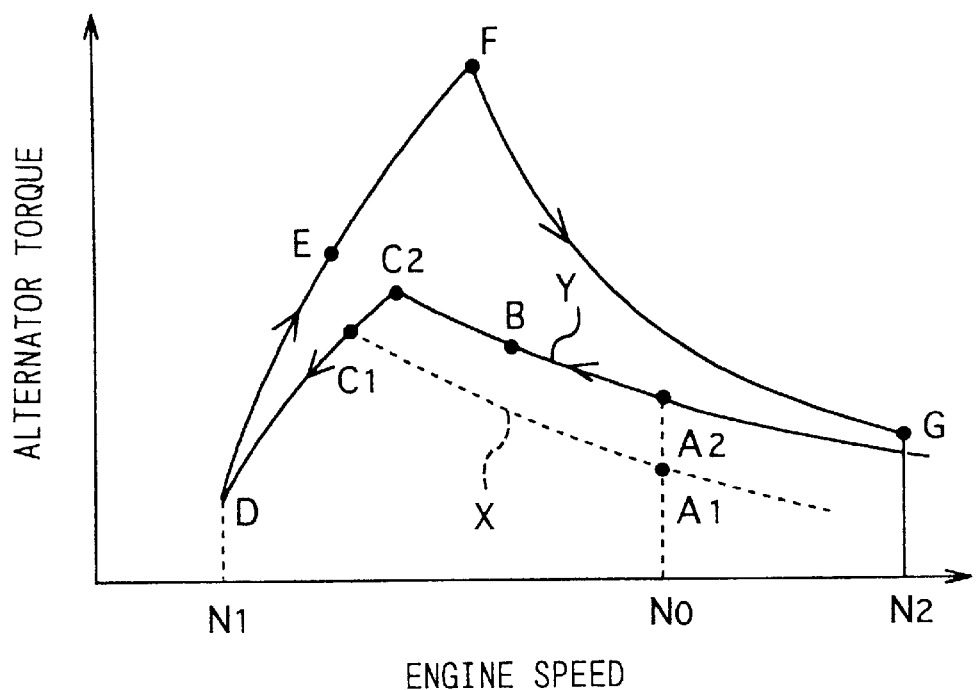
FIG. 18 is a graphical representation of the relationship between the rotational speed of the engine during low speeds of a prior-art motor vehicle alternator and the alternator drive torque (load torque) viewed from the engine.

The relationship between a change in the aforementioned rotational speed of the engine and a change in drive torque (hereinafter also simply referred to as load torque) of the motor vehicle alternator (hereinafter referred to as the alternator) will be explained with reference to FIG. 18.

A characteristic line (shown by a dashed line) connecting between coordinates A1-C1 represents the relationship between the rotational speed of the engine and the load torque with the alternator output W being equal to a predetermined certain value W1. A characteristic line (shown by a solid line) connecting between coordinates A2-C2 represents the relationship between the rotational speed of the engine and the load torque with the alternator output W being equal to a certain value W2 greater than W1. The coordinates C1 and C2 represent the load torque values with the minimum rotational speed possible to output the alternator outputs W1 and W2.

When the alternator runs at speeds lower than C1 or C2 with the alternator output W being equal to W1 or W2, the output W of the alternator can not supply sufficient power to electrical loads, thus the battery will be discharged to compensate for the shortage.

For example, suppose that the working point is stable at coordinate A1 in the region of rotational speeds for idle operation with permanent loads (i.e., minimum electrical loads required for running the vehicle such as for initiating ignition, driving fuel injection valves, and driving the control computer).

Now, connection of an additional electrical load to the alternator would cause the alternator to increase the exciting current in order to increase the output. The drive torque of the alternator is thereby increased and thus the working point shifts from point A1 to A2. At this time, the engine is injecting just enough fuel to remain stable at A1, so that the rotational speed of the engine is reduced and the working point is shifted to point B on the characteristic line Y.

In addition, a drop in rotational speed of the engine would cause an increase in drive torque of the alternator (load torque), thereby further reducing the working point beyond the point B.

At this time, the engine control system senses the drop in rotational speed and increases the amount of fuel injection to maintain the working point at point A2. However, a certain control delay time occurs until the rotational speed of the engine is recovered to point A2, thereby causing the working point to drop to point D and the battery to be discharged.

Control of the engine will, in a while, start increasing the rotational speed. However, the alternator will charge the battery to compensate for the previous discharge of the battery. At this time, the alternator outputs charge current for charging the battery in addition to the current required by the electrical loads. Consequently, this will cause the drive torque (load torque) viewed from the engine to increase and the working point to reach coordinate F through point E.

After the battery has been completely charged, the output current of the alternator will decrease to the value required by the electrical loads, thus reducing the load torque and allowing the working point to reach coordinate G.

Figure 19:
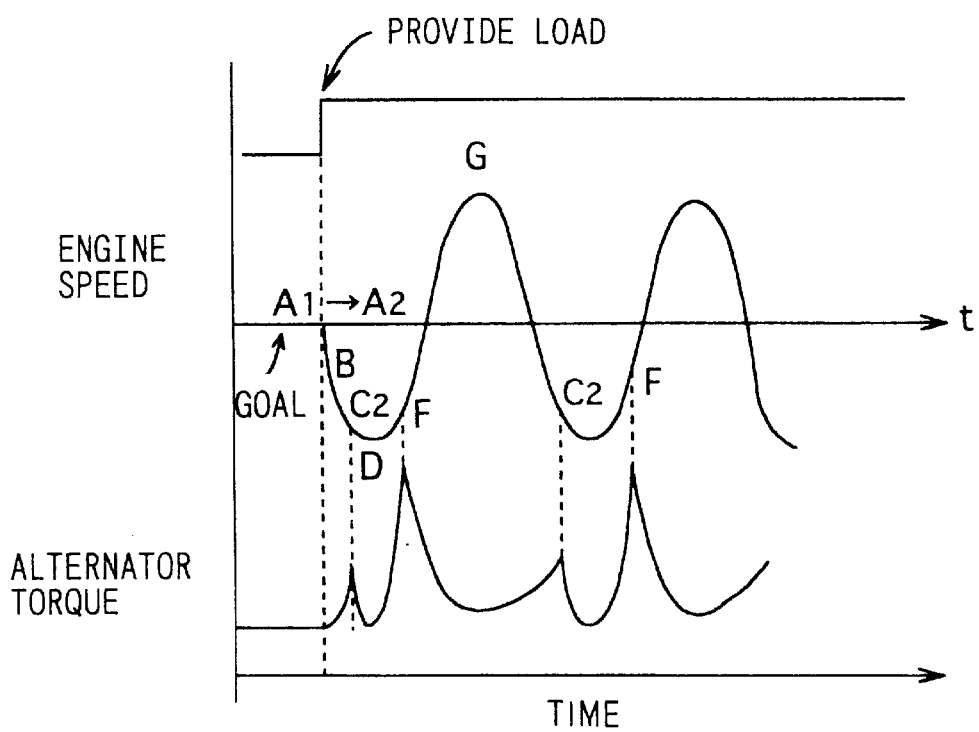
FIG. 19 is a timing chart illustrating the relationship in terms of the time between the rotational speed of the engine during low speeds of the prior-art motor vehicle alternator and the alternator drive torque (load torque) viewed from the engine.

At this time, to increase the rotational speed once reduced to point D, the engine will increase fuel supply. However, beyond point F, the load torque of the engine will decrease at once, thereby lowering the working point to point G. At this time, the control system will sense the increase in rotational speed and reduce the fuel injection to maintain the working point at point A2. However, the rotational speed of the engine will repeatedly fluctuate within the range from N1 to N2 due to the aforementioned variation in drive torque (load torque) of the alternator or the aforementioned control delay. This phenomenon is illustrated in terms of time in FIG. 19. It can be seen in the figure that a sudden change in torque has occurred which is different from the cycle of a variation in rotational speed. The battery discharge can be controlled when the alternator output has increased to improve hunting problem. However, this is not so easily employed from the viewpoint of mounting space, cost, and noise.

This problem can be solved by means of the present invention in which the control voltage is formed according to the battery voltage and the condition of the electrical circuitry is taken into account.

That is, the alternator can be prevented from generating an unreasonably excessive amount of electricity during the initial acceleration (e.g., from point D to F in FIG. 18) during low speeds. Thus, the battery is prevented from charging quicker than in the conventional art (e.g., at point F), causing the load of the engine to be reduced to allow the rotational speed of the engine to increase to N2. In other words, overshoots in the rotational speed of the engine exceeding the rotational speed for idle operation can be prevented, thereby reducing the maximum amplitude N2 of the fluctuation of rotational speed of the engine.

Furthermore, even during acceleration during low speeds, control will be shifted to normal control after the battery voltage has reached the steady state control voltage, thus preventing an abnormal increase in battery voltage. The normal control in the foregoing control means for allowing the battery voltage to converge to the steady state control voltage with the control voltage being employed as the steady state control voltage.

The controller is comprised of a circuit into which operational amplifiers or the like are incorporated or of a microcomputer and programs. The input means can be comprised of a sensor for sensing the rotational speed of the engine and the signal processing circuit therefor. Alternatively, the input means can have additional input processing steps that are implemented by programs. Control means can be a feedback control system which provides output according to a difference between the control voltage and the battery voltage. Input or the field current of a field coil for controlling the output of a motor vehicle alternator can be realized, for example, with switching devices for interrupting the power supplied from the power source to the field coil. A control signal to the switching devices can be employed as an output signal of the control means. The switching devices include for example power transistors. Furthermore, a base or a gate signal that serves as a control signal can be replaced with a pulse signal which is PWM modified according to a difference between the control voltage and the battery voltage. In addition, first setting means and second setting means can be realized, for example, with resistance potential divider circuit for setting the input voltage of the operational amplifiers. Alternatively, the first and second means can be realized with data stored in storage means of a microcomputer and processing steps for substituting the data into variable parameters in the operational processing. Here, the steady state control voltage can be employed as a constant value or a value to be changed according to the running condition of the engine or the vehicle. Furthermore, the acceleration control voltage at a certain time can be set, for example, either without a delay or with a predetermined delay according to the battery voltage at the same point of time. Also, the acceleration control voltage preferably perfectly follows the battery voltage over the entire period of the acceleration during low speeds. For example, the acceleration control voltage is gradually increased when the battery voltage is gradually increased, whereas the acceleration control voltage is not increased when the battery voltage is not increased due to heavy electrical loads. Also, it is also conceivable to employ a configuration or method that allows the acceleration control voltage to be set by estimating a change in battery voltage during acceleration during low speeds. For example, such an arrangement or method can allow the acceleration control voltage to be set as a ramp voltage that increases according to a certain function from the initial point in acceleration during low speeds.

The block diagram of a motor vehicle alternator used in embodiment 1 of the present invention is explained below with reference to FIG. 1. An alternator 2 is supplied with power from an engine 1 via a belt 3. An output terminal 20 of the alternator 2 supplies power to a battery 5 and a vehicle electrical load 6. Accordingly, the maximum alternator output (the maximum alternator current) determined by the rotational speed of the alternator 2 (proportional to the rotational speed of the engine) depends on the rotational speed of the engine. Consider some running conditions and particularly a case where the rotational speed of the engine is as low as the rotational speed for idle operation. In these cases, the alternator 2 would be lacking in power supplied to the vehicle electrical load 6, thereby causing the battery 5 to supply power to the vehicle electrical load 6.

The alternator 2 is provided with a controller 4 for PWM controlling of the battery voltage to a control voltage to control the exciting current and thereby adjust the alternator output to the battery 5 at a proper level.

The controller 4 comprises means 41 for sensing the rotational speed of the alternator 2 and mode switch means 42. The mode switch means 42 are to switch the state of power generation of the alternator 2 between a normal mode and a charge supression mode. In the normal mode, the battery 5 is charged normally at the normal time, whereas in the charge supression mode, the charging to the battery 5 is controlled during acceleration during low speeds. The controller 4 also comprises control voltage setting means 43 for setting the control voltage or the upper limit value of the supply voltage to the battery 5. Moreover, the controller 4 comprises switch means 44 for carrying out PWM control by interrupting the exciting current according to the result of comparison between the control voltage and the battery voltage.

Figure 2:
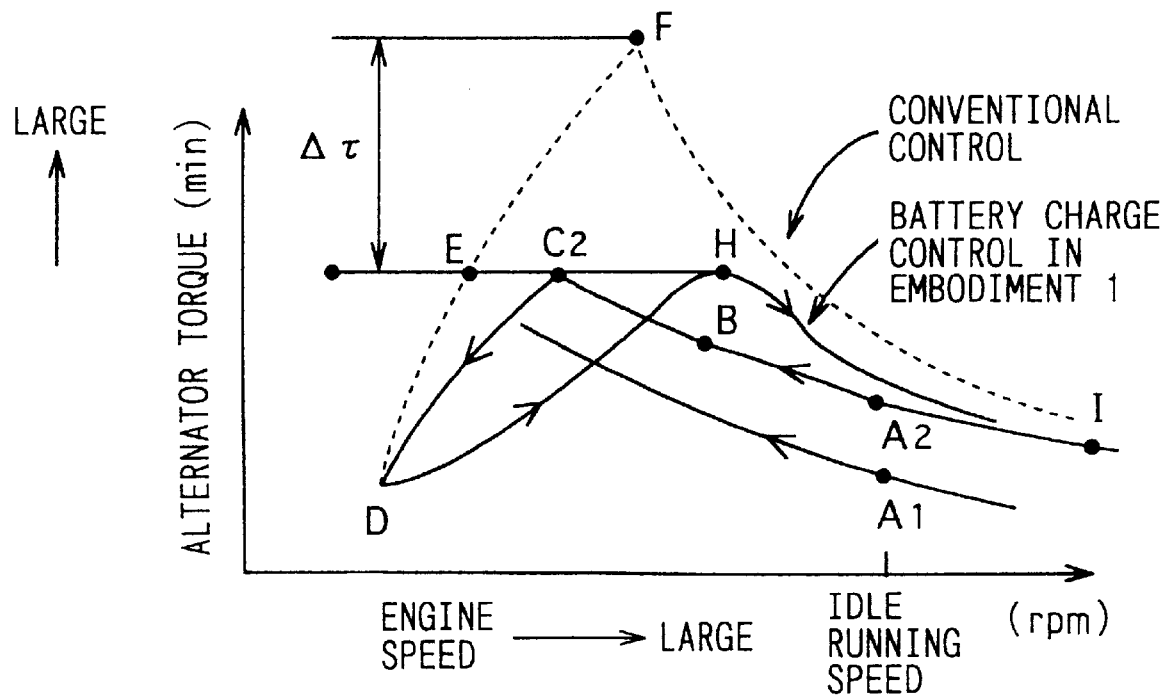
FIG. 2 is a graphical representation of the relationship between the rotational speed of the engine during low vehicle alternator speeds according to the drive torque (load torque) according to the present invention.

The relationship between the rotational speed of the alternator 2 and the drive torque (load torque) of the alternator is shown in FIG. 2.

At the steady state point A1 for the rotational speed for idle operation, the control voltage, that is, the upper limit value of the supply voltage to the battery 5 is set to 14.5V, with the output voltage of the alternator 2 generally being equal to 14.5V. At this time, the alternator 2 is running in the normal mode.

Connection of an electrical load would cause the alternator output to increase and thereby the drive torque (load torque) of the alternator to increase, thus causing the working point to be shifted from the stable point A1 to the stable point A2.

However, the rotational speed of the engine would decrease due to a sudden increase in load, causing the working point to be shifted from A1 through B and C2 to D as described above. Although the control voltage (steady state control voltage) has been set to 14.5V during the period from C2 to D, the alternator 2 cannot generate the output in response to the load, thus causing the output voltage to gradually decrease. That is, this will cause the voltage applied to the battery 5 to gradually decrease, meanwhile the charge polarization of the battery 5 is diminished and discharge is continued.

Meanwhile, feedback control is being carried out to increase the rotational speed of the engine, thereby allowing the rotational speed of the engine to start increasing from the minimum point D.

At this time, the controller of the alternator 2 senses the increase in rotational speed based on the P terminal waveform to set the control voltage to the acceleration control voltage higher than the battery voltage by the predetermined voltage difference $\Delta V1$. This is done within the voltage range lower than the voltage at the normal time (14.5V), that is, what is called in the present invention the steady state control voltage, and is higher than the battery voltage (12.5V) with the terminals of the battery 5 being made open.

However, a circuit system for generating the alternator output according to the acceleration control voltage after having sensed the battery voltage is provided with a delay system to prevent control from being performed at higher speeds. Thus, control responses are delayed to some extent. The delay in control can be produced by means of a delay circuit system for delaying the acceleration control voltage or alternatively by means of some other circuit impedance. Here, the acceleration control voltage is delayed at the pre-stage of the comparator which compares the control voltage or the acceleration control voltage with the battery voltage to adjust the duty ratio of the exciting current to the field coil.

The control will return to the original state after the battery voltage has reached the original steady state target value of 14.5V.

That is, the control voltage is set to a level higher by the predetermined voltage difference $\Delta V1$ than the battery voltage during acceleration during low speeds according to this embodiment. As described above, the charging is thereby controlled to allow the battery to be charged more slowly and the rotational speed of the engine to be increased more gradually. Thus, it becomes possible to realize a smoother change in drive torque (load torque) of the alternator viewed from the engine.

In contrast, with the conventional control (where the control voltage is equal to the constant steady state control voltage of 14.5V), the upper limit output voltage of the alternator 2 is 14.5V. Even at the working point E, the output voltage does not reach the upper limit because the battery has not been completely charged, and therefore the alternator 2 will continue full generation of power until the output voltage reaches 14.5V, thus allowing the working point to reach point F. That is, this control can be carried out to make the increase in drive torque of the alternator smaller by $\Delta\tau$.

Figure 3:
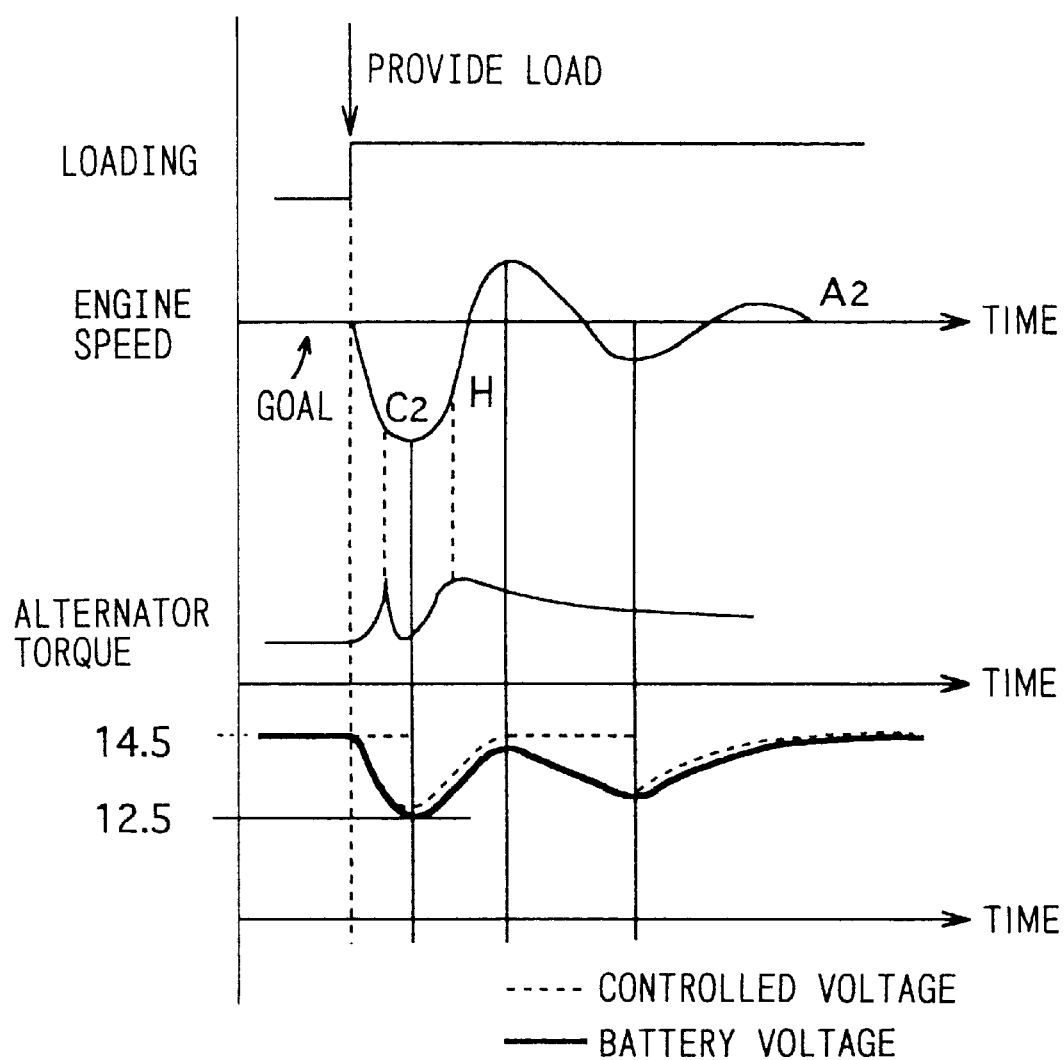
FIG. 3 is a timing chart illustrating the relationship according to time between the rotational speed of the engine during low vehicle alternator speeds and the alternator drive torque (load torque) according to the present invention.

The change in rotational speed of the engine and in drive torque of the alternator, after the electrical loads have been connected, and the change in battery voltage and in control voltage, shown in FIG. 2, are shown in the timing chart of FIG. 3.

Figure 4:
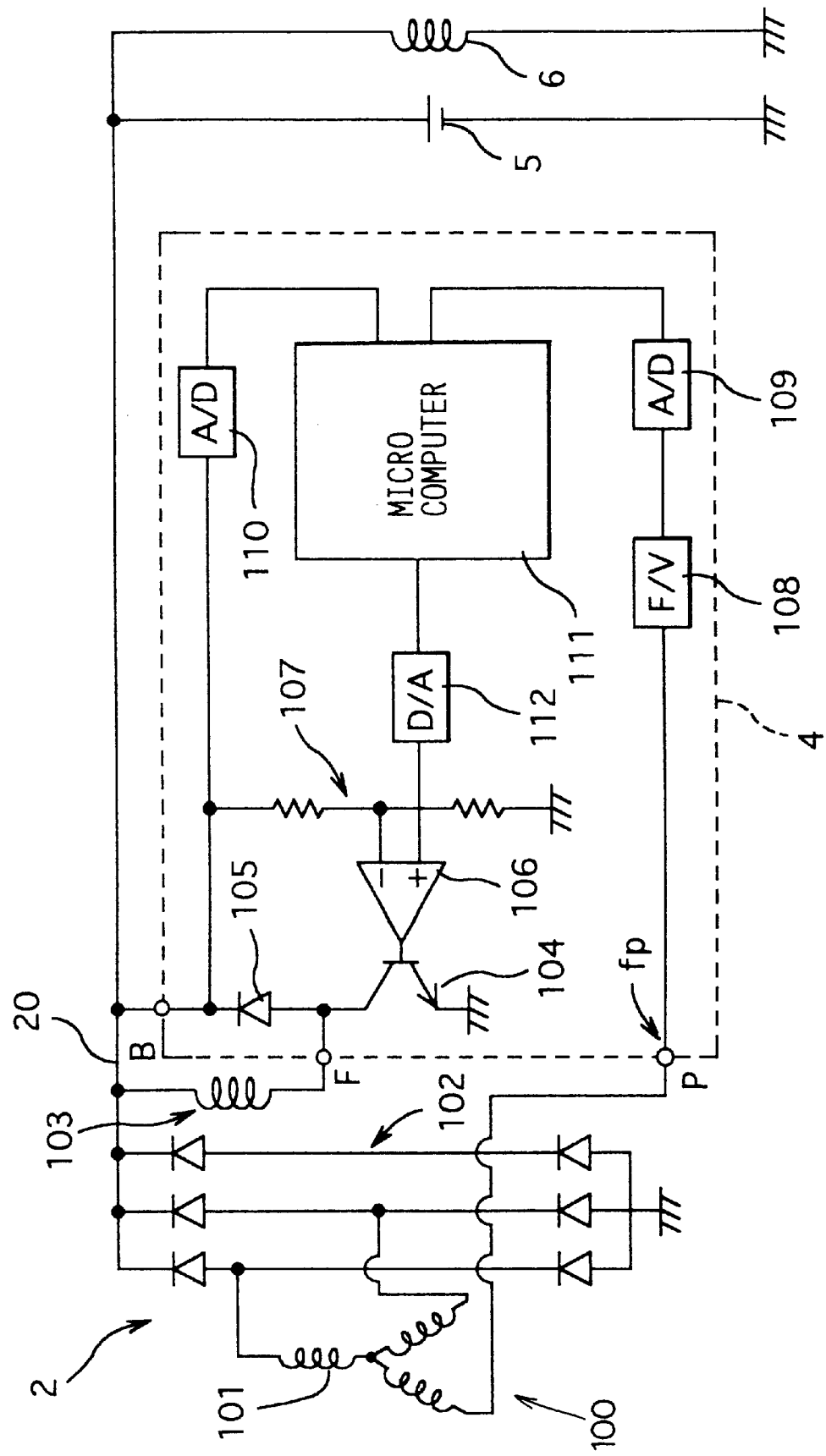
FIG. 4 is a circuit diagram illustrating a controller for use in the motor vehicle alternator according to the present invention.

As an example of the controller 4, a circuit for forming the control voltage by processing by a microcomputer is shown in FIG. 4.

Reference numeral 100 designates a motor vehicle alternator comprising a three phase armature coil 101, a three phase full wave rectifier 102, and a field coil 103. Reference numeral 104 designates a switching transistor for interrupting the exciting current, 105 designates a flywheel diode, and 106 designates a comparator for controlling the switching transistor 104. Reference numeral 107 designates a resistance potential divider circuit for dividing the battery voltage to input a divided voltage to the negative input terminal of the comparator 106. Reference numeral 108 designates a f/V converter for converting the frequency (operatively associated with the rotational speed of the engine) of the single phase voltage input from the three phase armature coil 101 to an analog voltage representative of the rotational speed of the engine. Reference numeral 109 designates an A/D converter for converting the aforementioned analog voltage output from the f/V converter 108 to a digital signal. Reference numeral 110 designates an A/D converter for converting the battery voltage to a digital signal. Reference numeral 111 designates a microcomputer for forming the control voltage according to the rotational speed of the engine and the battery voltage to be input. Reference numeral 112 designates a D/A converter for converting an output from the microcomputer to an analog voltage to input the voltage to the positive input terminal of the comparator.

Figure 5:
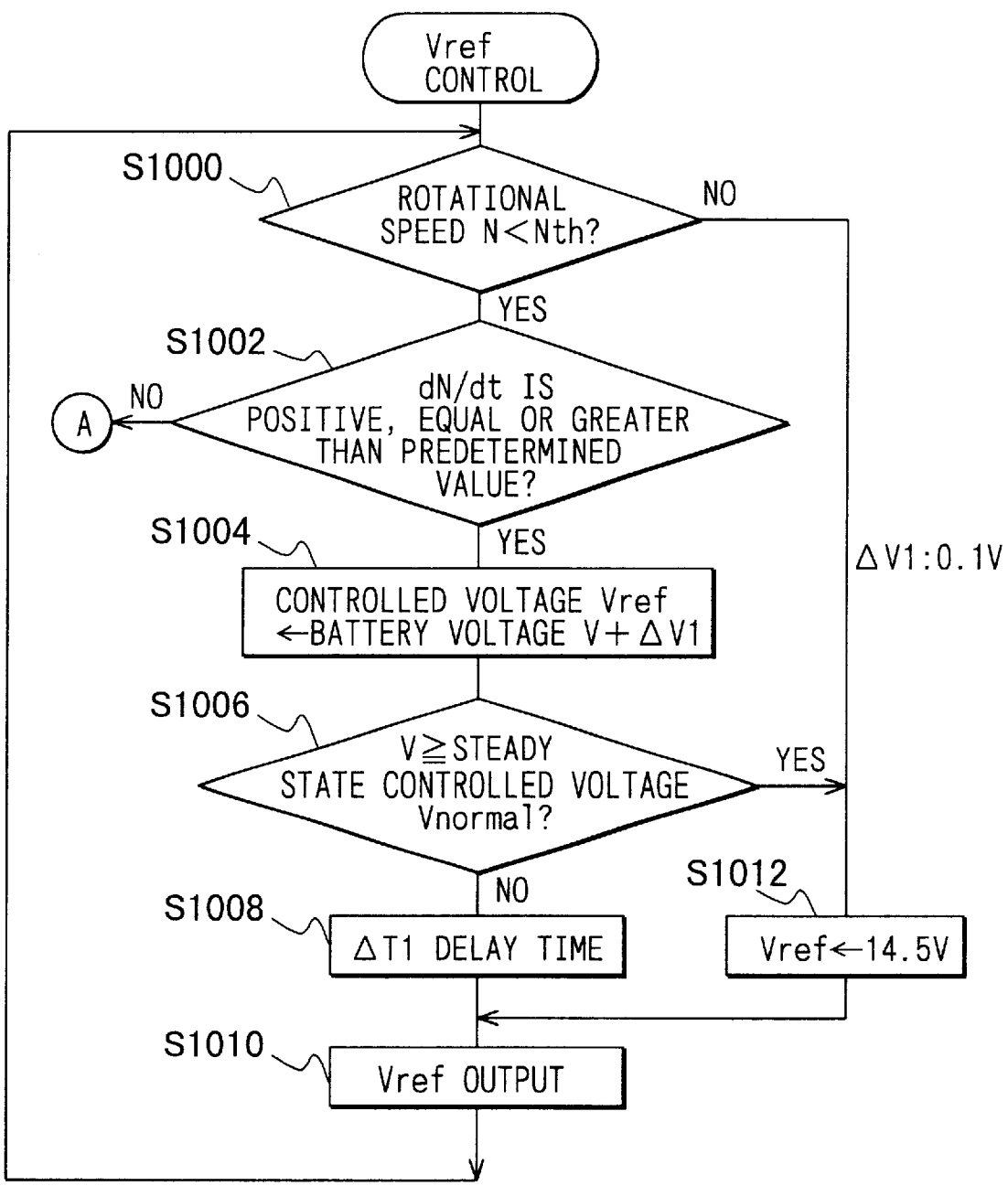
FIG. 5 is a flow chart illustrating the control of the motor vehicle alternator according to the present invention.

FIG. 5 shows a flow chart in which the microcomputer 111 forms the control voltage. First, in step 1000, it is checked if the rotational speed of the engine is equal to the predetermined value (equal to or slightly less than the rotational speed for idle operation). If the rotational speed is less than the predetermined value, step 1002 determines if the rate of increase in rotational speed of the engine is equal to or greater than the predetermined value. If the rate of increase in rotational speed of the engine is equal to or greater than the predetermined value, it is determined that the process is in acceleration during low speeds. Then, in step 1004, the predetermined voltage difference $\Delta V1$ is added to the battery voltage to form the control voltage. Then, in step 1006, it is checked if the battery voltage V has been recovered to the steady state control voltage (14.5V). If the battery voltage V has not recovered yet, the process will wait for a predetermined delay time$\Delta T1$ (step 1008) and then a control voltage Vref is output at step 1010. If the battery voltage V has already recovered, then the process proceeds to 1012. If the conditions are not satisfied in steps 1000 and 1002, then the control voltage Vref is set to 14.5V or the steady state control voltage (step 1012) and then the process proceeds to 1010.

In step 1000, instead of determining if the rotational speed of the engine N is less than the predetermined value, but if the battery voltage V is less than the predetermined value. In addition, in step 1002, instead of determining whether the rate of increase in rotational speed of the engine is equal to or greater than the predetermined value, if the rate of increase in battery voltage V is equal to or greater than the predetermined value can be determined.

(Embodiment 2)

Figure 6:
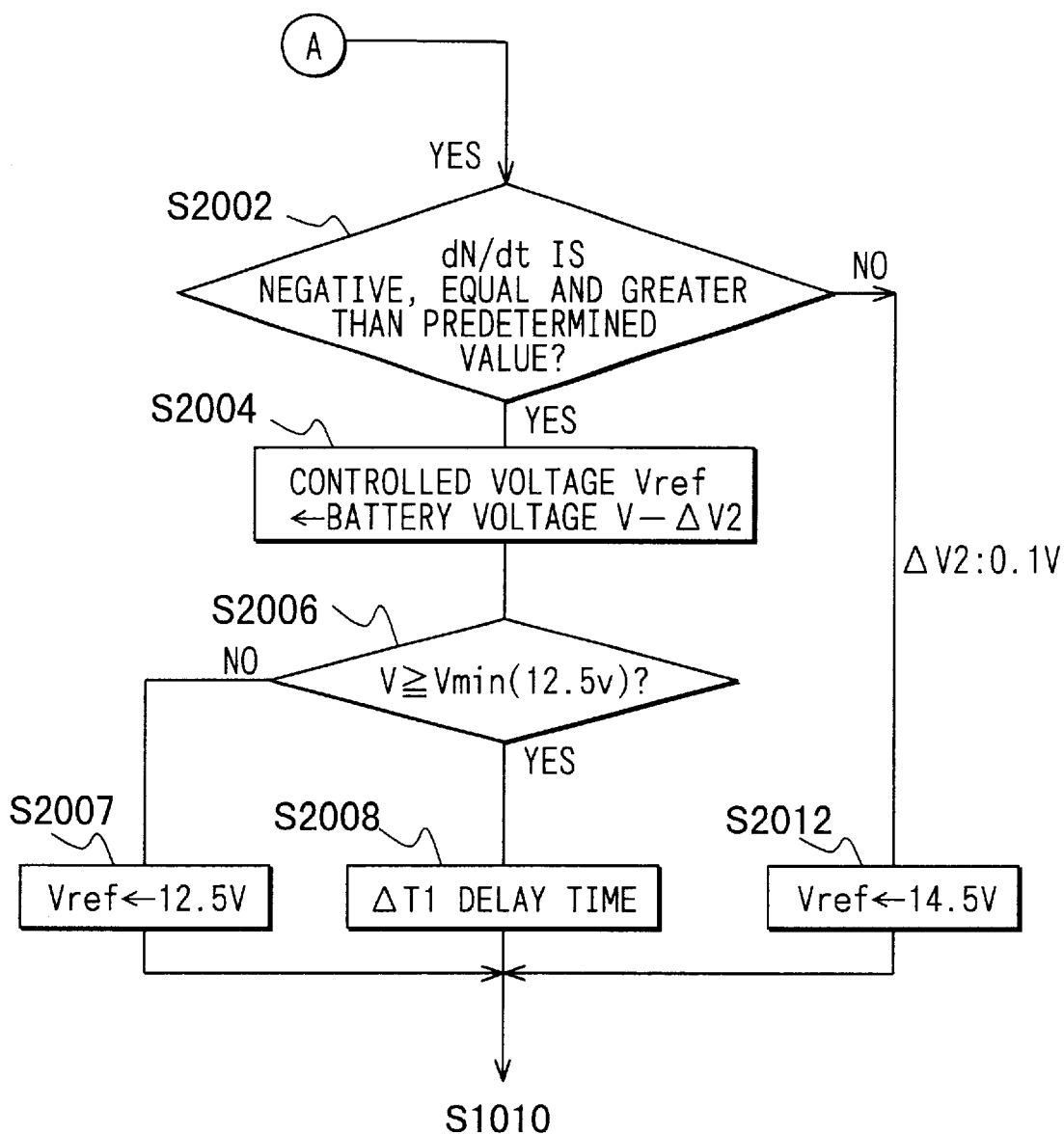
FIG. 6 is a flow chart illustrating the control of a motor vehicle alternator according to the present invention.

Now, another embodiment of the motor vehicle alternator according to the present invention is explained below with reference to the flow chart shown in FIG. 6. Also, this flow chart is executed if "N" has been given in step 1002 in FIG. 5.

First, it is checked if the rate of decrease in rotational speed of the engine is equal to or greater than the predetermined value in step 2002. If yes, it is determined that the process is within during deceleration during low speeds, and then the predetermined voltage difference $\Delta V2$ is subtracted from the battery voltage to form the control voltage Vref in step 2004. Then, it is determined if the battery voltage V has been reduced to the minimum voltage Vmin (12.5V) of the battery voltage (2006). If yes, the control voltage Vref is fixed to 12.5V (2007). If no, the process will wait for the predetermined delay time $\Delta T2$, step 2008, and then proceed to step 1010.

If the conditions are not satisfied in steps 1000 and 1002, then the control voltage Vref is set to 14.5V or the steady state control voltage (2012) and then the process proceeds to step 1010.

In step 2000, instead of determining if the rotational speed of the engine N is less than N1, it can be determined if the battery voltage V is less than the predetermined value. In addition, in step 2002, it may be determined if the rate of decrease in battery voltage V is equal to or greater than the predetermined value.

Embodiment 3.

Figure 7:
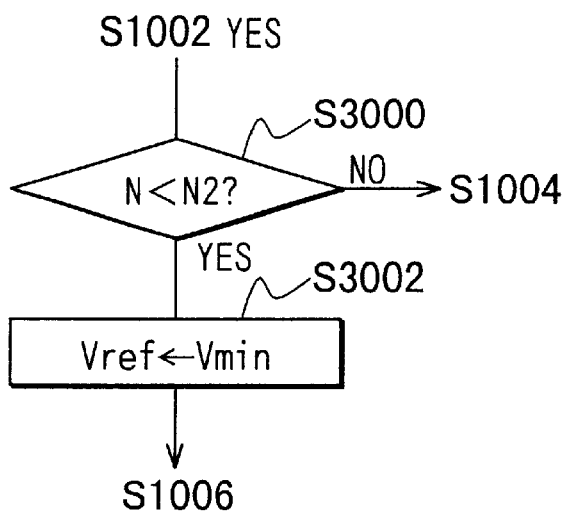
FIG. 7 is a flow chart illustrating the control of a motor vehicle alternator according to the present invention.

Referring to FIG. 7, a flow chart is shown that is executed immediately after the step 1002 of FIG. 5 for the third embodiment.

First, it is checked if the rotational speed of the engine N is equal to the predetermined value N2 in step 3000. The value N2 is less than the rotational speed for idle operation and greater than the minimum rotational speed during shift during deceleration during low speeds to that of acceleration during low speeds. If the speed N is less than the value N2, then the control voltage Vref is fixed to the battery voltage during the aforementioned minimum rotational speed or the minimum battery voltage, step 2002. If not, the process proceeds to step 1004.

Also, in step 3000, it may be determined not if the rotational speed of the engine N is less than N2 but if the battery voltage V is less than the predetermined value.

Figure 8:
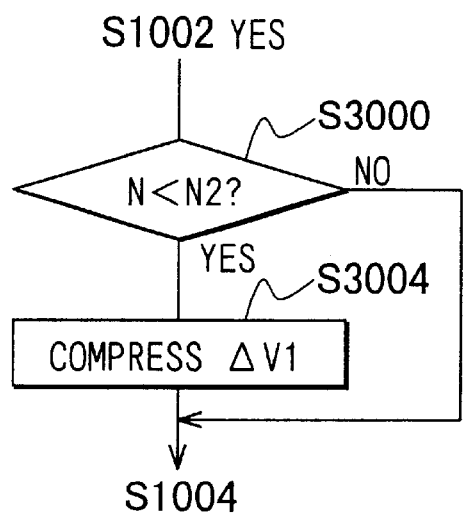
FIG. 8 is a flow chart illustrating a modified example of controlling a motor vehicle alternator according to the present invention.

(Other Embodiment)

in FIG. 8., when the rotational speed of the engine N of FIG. 7 is below N2, the predetermined voltage difference $\Delta V1$ can be compressed to approximately half instead of as provided in step 3002. This allows prohibition or suppression of battery charging at the initial stage of acceleration during low speeds.

Figure 9:
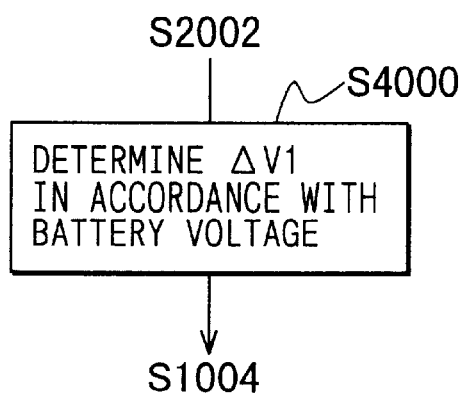
FIG. 9 is a flow chart illustrating motor control of a motor vehicle alternator according to the present invention.

Referring to FIG. 9, a fourth embodiment is provided. This flow chart is executed between steps 1002 and 1004 of FIG. 5.

In step 4000, the predetermined voltage difference ΔV1 is determined according to the battery voltage based on a built-in map. Also, the built-in map is adapted to increase the predetermined voltage difference ΔV1 as the battery voltage increases. This makes it possible to prohibit or suppress the battery charging at the initial stage of acceleration during low speeds.

(Embodiment 5)

Figure 10:
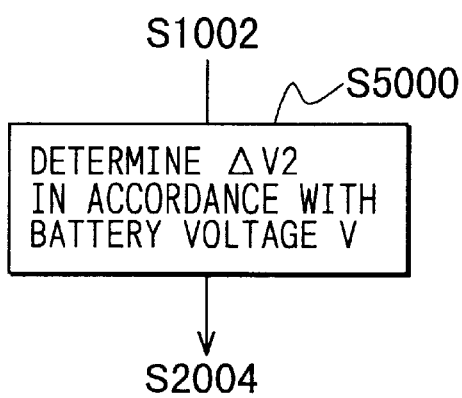
FIG. 10 is a flow chart illustrating an example of controlling a motor vehicle alternator according to embodiment 5.

Referring to FIG. 10, a fifth embodiment is described. This flow chart is also executed between steps 2002 and 2004 of FIG. 6. In step 5000, the predetermined voltage difference ΔV2 is determined based on a built-in map according to the battery voltage. Also, the built-in map is adapted to increase the predetermined. voltage difference ΔV2 as the battery voltage decreases. This makes it possible to prohibit or suppress the battery charging at the final stage of during deceleration during low speeds.

(Other Embodiments)

In the above explanations, the control voltage Vref was changed to smooth the drop in rotational speed of the engine and in battery voltage after the connection of the electrical loads and a variation in drive torque (load torque) of the alternator viewed from the engine during the subsequent recovery period. However, it is apparent that conversely calculating the amount of control equal to the aforementioned control voltage Vref on the signal voltage applied to the negative input terminal of the comparator 106 would also yield an equivalent result in terms of circuit.

In place of the embodiments described above, the following configuration can be employed. For example, the rotational speed of the engine can be used by sensing the rotational speed of a rotational member such as the crankshaft or camshaft of the engine or the rotational speed of the motor vehicle alternator. In addition, the rotational speed of the motor vehicle alternator can be sensed with a sensor for sensing the rotational speed of the shaft of the alternator or by the speed-dependent ripple components appearing in the alternator output of the alternator.

(Embodiment 6)

Figure 11:
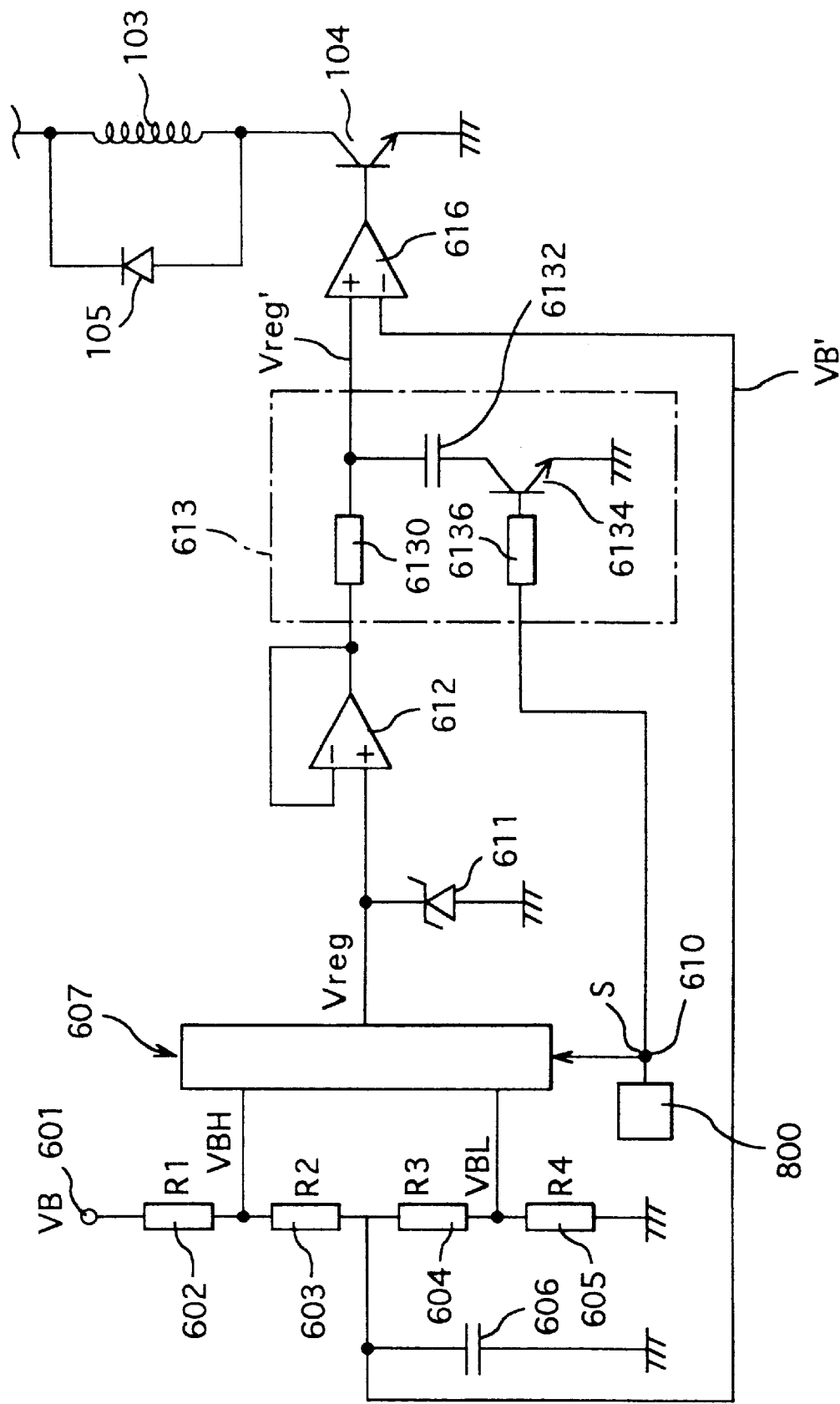
FIG. 11 is a circuit diagram illustrating an example of the controller of a motor vehicle alternator according to embodiment 6.

In FIG. 11, a sixth embodiment is described. FIG. 11 shows an example of software processing of the controller 4 according of the embodiment 1, the function being implemented by hardware. More specifically, the circuit is different from that of FIG. 1 only in the base input circuit portion of the transistor 104. This reduce the cost, reliability, and low noise (a good resistance to EMC) of controller 4.

Reference numeral 601 designates a sensor terminal or a so-called S-terminal for sensing the voltage of the vehicle battery, and reference numerals 602 to 605 designate resistor elements for dividing the sensed battery voltage, each resistance value is set to R1, R2, R3, and R4. The resistor elements 602 to 605 are connected in series to constitute a resistance potential divider circuit for outputting a plurality of voltages. R2 and R3 are set to resistance values lower than those of R1 and R4.

Reference numeral 606 designates a capacitor that constitutes a low-pass filter in conjunction with the resistor elements 602 and 603. The low band component of the battery voltage output from the high potential terminal of the capacitor 606 is input into the negative input terminal of a comparator 616.

Reference numeral 607 designates an analog multiplexer circuit for selecting a first divider voltage to be output from the aforementioned resistance potential divider circuit ((R2+R3+R4)·VB/(R1+R2+R3+R4)) or a second divider voltage (R4·VB/(R1+R21+R3+R4)). According to the selection signal S input from an input terminal 610, the analog multiplexer circuit 607 selects and then outputs the first divider voltage as an acceleration control voltage VBH and the second divider voltage as a deceleration control voltage VBL. That is, the analog multiplexer circuit 607 selects, as a control voltage Vreg, the acceleration control voltage VBH which is higher by a drop in voltage of the resistor element 603 than a third divider voltage VBM corresponding to the battery voltage during acceleration. On the other hand, the analog multiplexer circuit 607 selects, as a control voltage Vreg, the deceleration control voltage VBL which is lower by a drop in voltage of the resistor element 604 than the third divider voltage VBM corresponding to the battery voltage during deceleration. For example, setting can be carried out so that R1=10 K. R4=20 K., R2=100., and R3=20.

Reference numeral 611 designates a Zener diode for setting an upper limit of the control voltage Vreg output by the analog multiplexer circuit 607, the upper limit being set to 14.5V in terms of the battery voltage. Reference numeral 612 designates a voltage follower circuit. The current amplified control voltage Vreg is output to the positive input terminal of the comparator 616 through a delay circuit 613. The comparator 616 interrupts the transistor 104 to control the field current flowing through the field coil 103.

The delay circuit 613 turns off the delay action. In this embodiment, as shown in FIG. 11, the delay circuit 613 comprises a resistor element 6130, an integrating capacitor 6132, a common emitter transistor 6134, and a base current limiting resistor 6136.

A high level potential of the selection signal S with the common emitter transistor 6134 being turned on will allow the integrating capacitor 6132 to be charged or discharged. In addition, the delay circuit 613 delays an input signal by a time interval determined according to the CR time constant. The selection signal S being at a low-level voltage and the transistor 6134 being turned off will not allow the integrating capacitor 6132 to be charged or discharged. The potential at the coupling point of the resistor element 6130 and the integrating capacitor 6132 becomes equal to the output terminal of the voltage follower circuit 612.

Figure 12:
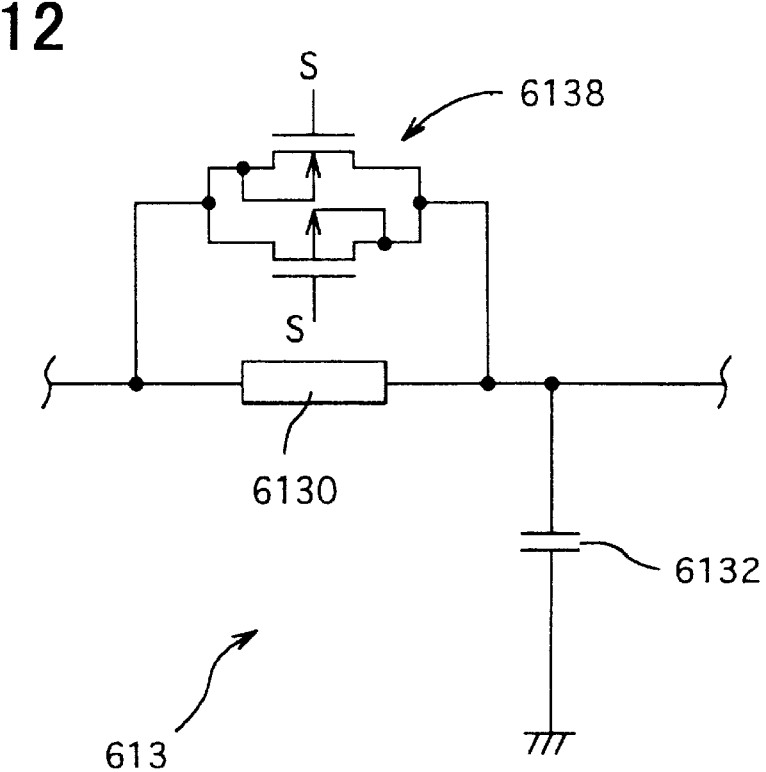
FIG. 12 is a circuit diagram illustrating a delay circuit according to the present invention.

The delay circuit 613 turns off the delay action may be configured as shown in FIG. 12. That is, the delay circuit 613 has a CMOS analog switch (transfer gate) 6138 which is connected in parallel to the resistor element 6130. Turning on the CMOS analog switch (transfer gate) 6138 of FIG. 12 will cause the delay action of the delay circuit 613 to be turned off. Turning off the CMOS analog switch (transfer gate) 6138 will cause the delay circuit 613 to implement the delay action thereof.

Figure 13:
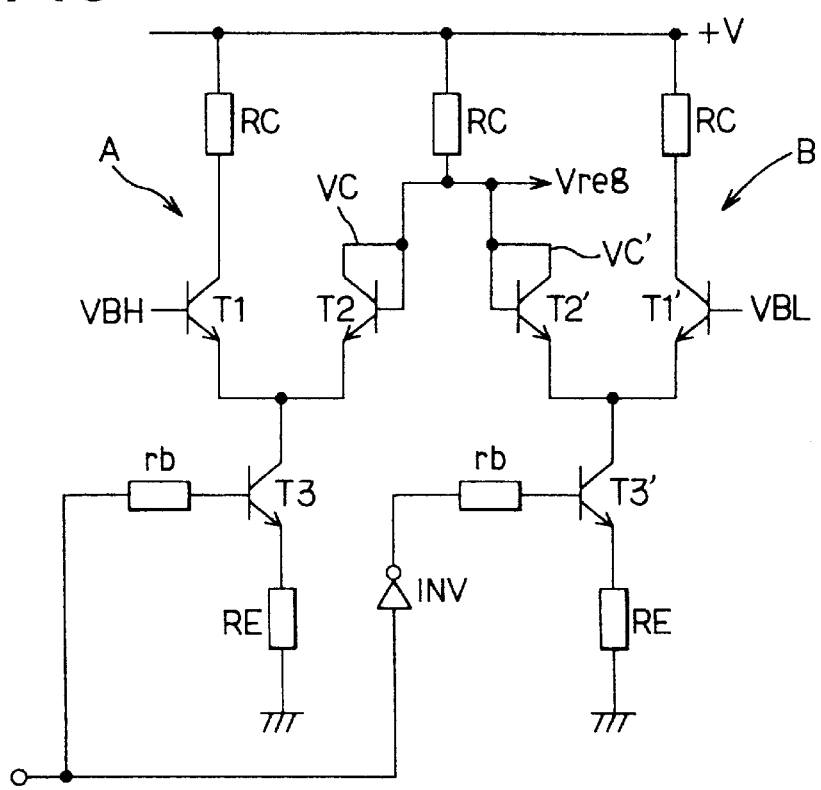
FIG. 13 is a circuit diagram illustrating an example of an analog multiplexer circuit according to the present invention.

The delay circuit 613 has a CR time constant, for example, 10 seconds (R5=100 K., C1=100 μF). FIG. 13 provides an example of the analog multiplexer circuit 607 that includes npn bipolar transistor circuits. Naturally, two CMOS analog switches (transfer gates) 6138 shown in FIG. 12 can be provided and operated in a reverse-biased manner to implement the analog multiplexer circuit 607.

The analog multiplexer circuit 607 shown in FIG. 13 comprises substantially two differential amplifier circuits A, B connected to each other. Transistors T1-T3, T1'-T3, three collector resistors RC, two emitter resistors RE, and two base current limiting resistors RB are used, which have similar characteristics to each other in each of the groups.

The acceleration control voltage VBH is applied to the base contact of the transistor T1, whereas the deceleration control voltage VBL is applied to the base contact of the transistor T1'.

A high level of the selection signal S will allow the transistor T3 to turn on and an inverter INV to turn off the transistor T3', causing the transistor T2 of the differential amplifier circuit A to output a collector voltage VC as the control voltage Vreg. The collector voltage VC becomes generally equal to the acceleration control voltage VBH because drops in forward voltage between the base and emitter of the transistors T1, T2 are generally equal to each other.

A low level of the selection signal S will allow the transistor T3' to be turned on and the transistor T3 to be turned off, causing the transistor T2' of the differential amplifier circuit B to output the collector voltage VC' as the control voltage Vreg. The collector voltage VC' becomes generally equal to the deceleration control voltage VBL because drops in forward voltage between the base and emitter of the transistors T1', T2' are generally equal to each other.

Figure 14:
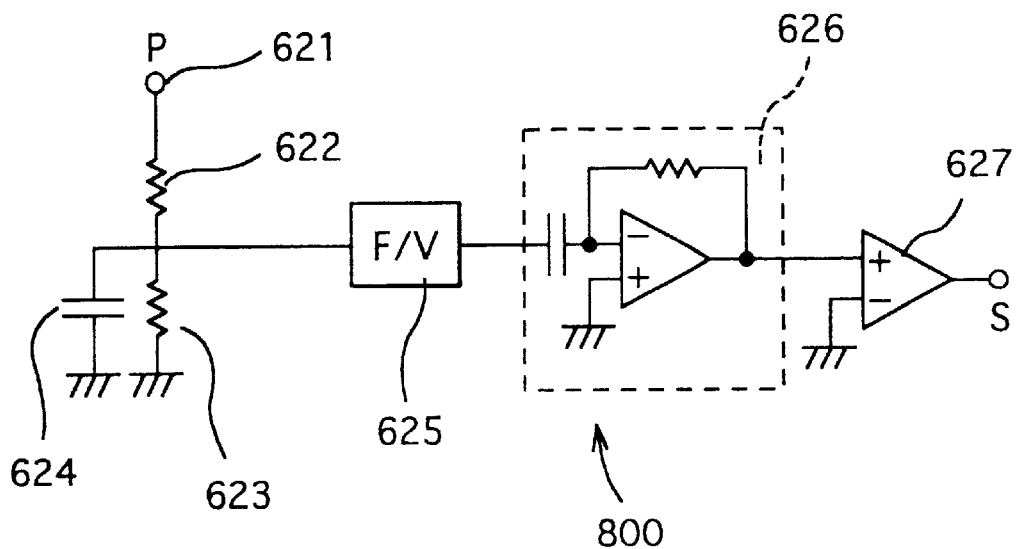
FIG. 14 is a circuit diagram illustrating an example of a circuit for forming a selection signal S according to the present invention.

FIG. 14 shows an example of a circuit constituting the switch control circuit 800 shown in FIG. 11, using a signal voltage input from the output terminal of one phase of the armature coil 101. The switch control circuit 800 generates the selection signal S.

During normal power generation, a rectangular wave voltage of duty 50% is input to the P terminal, causing the rectangular wave voltage to decrease in period with increasing rotational speed. The rectangular wave voltage is divided by means of the resistance potential divider circuit comprising resistor elements 622, 623 to be converted by an F/V converter 625 into analog voltages having a magnitude proportional to the rotational speed. Then, the analog voltages are differentiated by means of a differential circuit 626 and then sensed by a comparator 627. Reference numeral 624 designates a bypass capacitor 624 for cutting high frequency noises. The differential circuit 626 is a known circuit which employs operational amplifiers. However, such a circuit of a known type may be naturally used which employs no operational amplifiers.

When rotational speed is decreased, formation of the selection signal will cause the differential circuit 626 to provide a negative output and the selection signal S to provide a low level potential. Consequently, a value of the control voltage Vreg lower than the battery voltage which is divided by R4/(R1+R2+R3+R4) will be selected, causing the delay circuit to be released.

On the other hand, when rotational speed is increased, the differential circuit 626 provides a positive output and the selection signal S provides a high level potential. Consequently, the control voltage Vreg will take on a value proportional to (R2+R3+R4)/(R1+R2+R3+R4), causing the delay circuit to be operated.

This will obviate the need to use a microcomputer circuit, thus making it possible to realize a circuit having improved resistance to noise.

(Other Embodiments)

Figure 15:
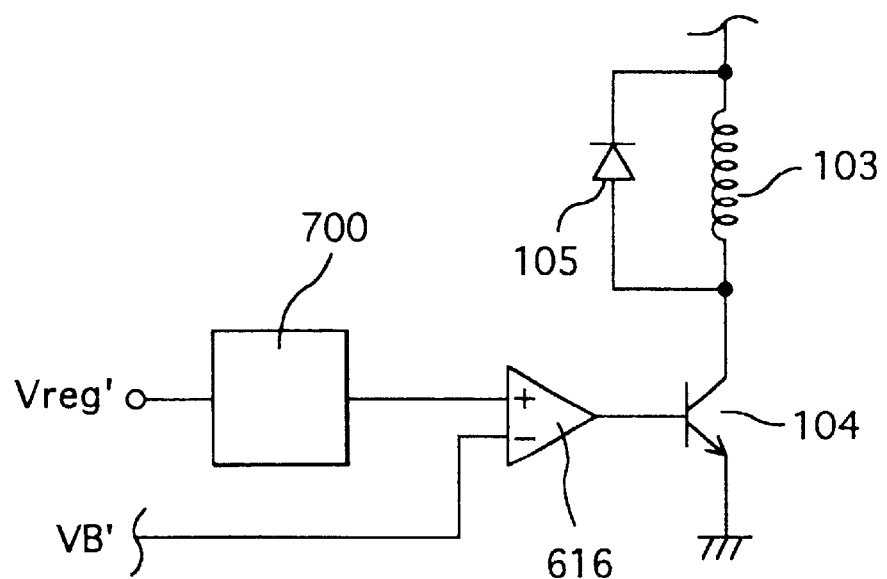
FIG. 15 is a circuit diagram illustrating a modification of the present invention.

In FIG. 15, a saw tooth wave superposition circuit 700 is interposed between the output terminal of the delay circuit 613 and the positive input terminal of the comparator 616, in the circuit according to embodiment 6 shown in FIG. 11.

The saw tooth wave superposition circuit 700 superimposes a saw tooth wave voltage (a triangle wave voltage may also be employed) on the control voltage Vreg' output from the delay circuit 613. The saw tooth wave superposition circuit of this type is already well known and is not explained by illustration here. However, it is understood that the saw tooth wave voltage is greater in amplitude than the aforementioned voltages ΔV1, ΔV2 (for example, 0.1V) and is sufficiently smaller in period than the time constant of the field coil 103 (for example, 10 msec).

The effects of the superposition of the saw tooth wave voltage on the control voltage Vreg' will be explained below with reference to FIGS. 16 and 17.

Figure 16:
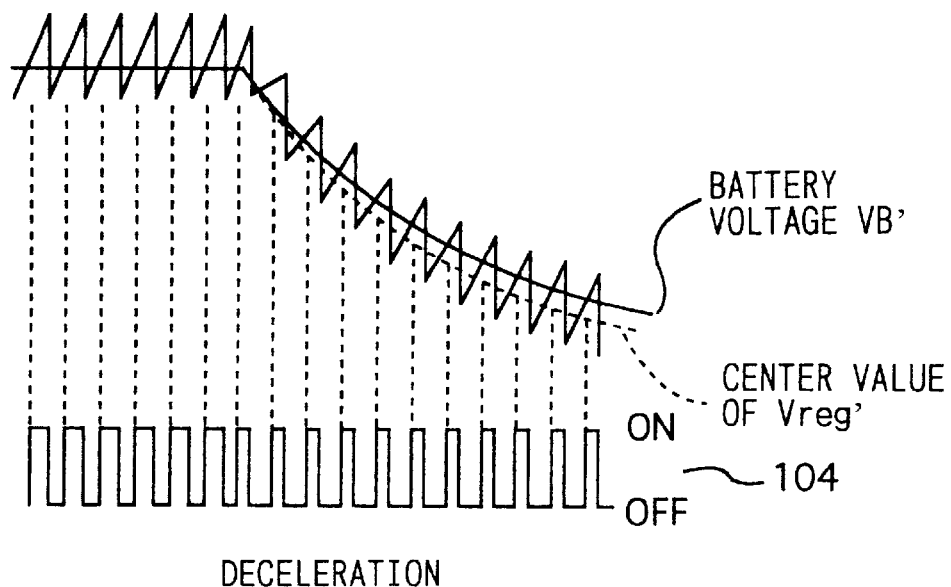
FIG. 16 is a timing chart during deceleration illustrating the voltage of each portion of a circuit according to the present invention.

As can be seen in FIG. 16, switching is performed generally at 50% of duty. Thus, the duty can be prevented from suddenly dropping to zero percent, causing the generation to come to a standstill, even when the center value of the control voltage decreases during deceleration. Thus, it is possible to prevent a sudden variation in torque.

Figure 17:
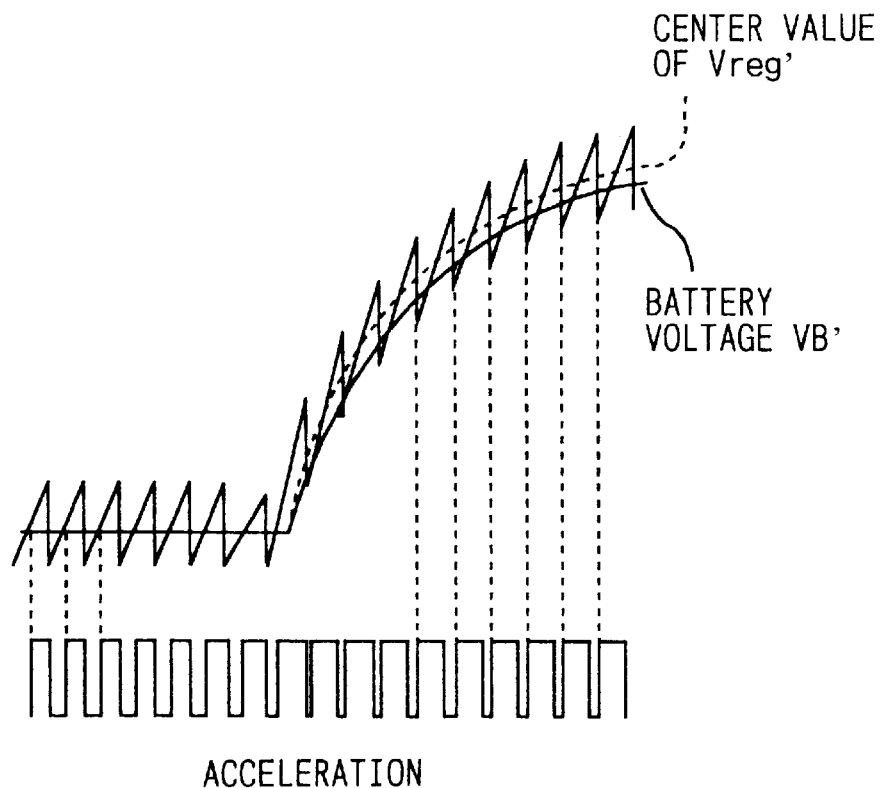
FIG. 17 is a timing chart during acceleration illustrating the voltage of each portion of the circuit shown in FIG. 15.

As shown in FIG. 17, even during acceleration, the duty can be prevented from increasing suddenly to 100%. That is, the generation duty can be controlled within a predetermined range relative to a variation in center value of the control voltage Vreg', thereby making it possible to prevent a sudden change in torque.

Also, in place of the triangle wave voltage or the saw tooth wave voltage, other alternating voltages may be superposed on the control voltage.

While the above-described embodiments refer to examples of usage of the present invention, it is understood that the present invention may be applied to other usage, modifications and variations of the same, and is not limited to the disclosure provided herein.

What is claimed is:

1. A motor vehicle alternator driven by an engine, comprising:

a field coil;

an armature coil;

a speed sensor portion for sensing a rotational speed of said engine according to a quantity of electricity operatively associated with the rotational speed of said engine;

a rectifier for rectifying an alternating voltage generated by said armature coil to apply an output voltage to a battery and an electrical load; and a controller that sets a control voltage to a predetermined steady state control voltage to control a field current according to a difference between said control voltage and a battery voltage of said battery to allow said battery voltage to converge with said control voltage;

wherein said controller sets said control voltage to an acceleration control voltage that is higher than said battery voltage by a predetermined voltage difference, said control voltage being higher than said battery voltage and less than said steady state control voltage during acceleration at low speeds when said rotational speed is equal to or less than a predetermined value and a rate of increase of said rotational speed is equal to or greater than a predetermined value.

2. The motor vehicle alternator according to claim 1, wherein:

said controller sets said control voltage to a deceleration control voltage that is lower than said battery voltage by a second predetermined voltage difference, said second predetermined voltage set after said rotational speed of the engine has decreased below a first predetermined rotational speed value and during deceleration during low speeds, said deceleration being at a rate of decrease of said rotational speed of equal to or greater than a predetermined value.

3. The motor vehicle alternator according to claim 1, wherein:
said controller sets the second predetermined voltage difference smaller than the first predetermined voltage difference, said first predetermined voltage difference is set during the first acceleration period when the rotational speed of the engine increases from a minimum rotational speed value to a rotational speed being equal to or greater than a second predetermined rotational value, said second predetermined voltage difference is set during the second acceleration period after said first acceleration period.

4. The motor vehicle alternator according to claim 1, wherein:
said controller allows said predetermined voltage difference to increase at a later stage of said acceleration during low speeds.

5. The motor vehicle alternator according to claim 1, wherein:
said controller sets said control voltage to a deceleration control voltage that is less than said battery voltage by the second predetermined voltage difference and allows said second predetermined voltage difference to increase at a later stage during said deceleration during low speeds, during a period of deceleration during low speeds with said rotational speed, immediately before said rotational speed of the engine is increased, being equal to or less than a predetermined value and said rate of decrease in rotational speed being equal to or greater than a predetermined value.

6. A controller for use in a motor vehicle alternator comprising:
input means for inputting a quantity of electricity operatively associated with a rotational speed of an engine and a battery voltage;
output means for outputting an output signal to control a field current of a field coil;
control means for varying said output signal to allow said battery voltage to approach a control voltage;
first setting means for setting said control voltage to a predetermined steady state control voltage; and
second setting means for setting said control voltage to an acceleration control voltage that is higher than said battery voltage by a predetermined voltage difference, said control voltage set higher than said battery voltage and less than said steady state control voltage during acceleration at low speeds where the rotational speed of the engine is equal to or less than a predetermined value and a rate of increase in said rotational speed is equal to or greater than a predetermined value.

7. A method for controlling a motor vehicle alternator, wherein a quantity of electricity operatively associated with a rotational speed of an engine and a battery voltage are input, and a field current is controlled to allow said battery voltage to approach a control voltage, said method comprising the steps of:
setting said control voltage to a predetermined steady state control voltage; and
setting said control voltage to an acceleration control voltage that is higher than said battery voltage by a predetermined voltage difference, said control voltage set higher than said battery voltage and less than said steady state control voltage during acceleration at low speeds where the rotational speed of the engine is equal to or less than a predetermined value and a rate of increase in said rotational speed is equal to or greater than a predetermined value.

8. The motor vehicle alternator according to claim 1, wherein said controller comprises:
a resistance potential divider circuit having multiple resistor elements connected in series to form a plurality of divider voltages of said battery voltage;
a plurality of switches for selecting any one of said divider voltages as said acceleration control voltage or said deceleration control voltage; and
a switch control circuit for switching each of said switches according to said rotational speed of the engine.

9. The motor vehicle alternator according to claim 8, wherein:
said switch control circuit switches said switches according to said rotational speed of the engine sensed according to a voltage of one phase output from an output terminal of an armature coil.

10. The motor vehicle alternator according to claim 8, wherein:
said control means provides a greater time delay in response to control during said acceleration during low speeds than a time delay in response to control during said period of deceleration during low speeds.

11. The motor vehicle alternator according to claim 10, wherein:
said control means has a delay circuit for determining a delay time in response to control during said acceleration during low speeds; and
said delay circuit is turned off during said deceleration during low speeds.

12. The motor vehicle alternator according to claims 8, wherein said control means turns on and off said delay circuit with switching of said switches according to said switch control circuit.

13. The motor vehicle alternator according to any one of claims 1 or 8, wherein
said control means superimposes an alternating voltage greater in amplitude than said predetermined voltage difference on said acceleration control voltage or said deceleration control voltage.

14. The motor vehicle alternator according to claim 13, wherein said alternating voltage has a triangular waveform or a saw tooth waveform.

15. A motor vehicle alternator comprising:
a field coil;
an armature coil;
a speed sensor portion for sensing a rotational speed of an engine;
a rectifier for rectifying an alternating voltage generated by said armature coil to apply an output voltage to a battery and an electrical load; and
a controller for setting a control voltage to a predetermined steady state control voltage to control a field current according to a difference between said control voltage and a battery voltage of said battery to allow said battery voltage to converge with said control voltage;
wherein said controller sets said control voltage to an acceleration control voltage that is higher than said battery voltage by a predetermined voltage difference, said control voltage set higher than said battery voltage and less than said steady state control voltage during acceleration at low speeds with said rotational speed being equal to or less than a predetermined value and a rate of increase in said rotational speed being equal to or greater than a predetermined value.

16. The motor vehicle alternator according to claim 15, wherein:

said controller sets said control voltage to a deceleration control voltage that is lower than said battery voltage by a second predetermined voltage difference after said rotational speed of the engine has decreased below a first predetermined rotational speed value, during deceleration at low speeds with a rate of decrease of said rotational speed being equal to or greater than a predetermined value.

17. The motor vehicle alternator according to claim 15, wherein said controller sets the second predetermined voltage difference smaller than the first predetermined voltage difference, said first predetermined voltage difference is set during the first acceleration period when the rotational speed of the engine increases from a minimum rotational speed value to a rotational speed being equal to or greater than a second predetermined rotational value, said second predetermined voltage difference is set during the second acceleration period after said first acceleration period.

18. The motor vehicle alternator according to claim 15, wherein:

said controller allows said predetermined voltage difference to increase at a later stage of said acceleration during low speeds.

19. The motor vehicle alternator according to claim 15, wherein:

said controller sets said control voltage to a deceleration control voltage that is less than said battery voltage by the second predetermined voltage difference and allows said predetermined voltage difference to increase at a later stage of said period of deceleration during low speeds, during a period of deceleration during low speeds with said rotational speed, immediately before said rotational speed of the engine is increased, being equal to or less than a predetermined value and said rate of decrease in rotational speed being equal to or greater than a predetermined value.

20. A controller for use in a motor vehicle alternator comprising:

input means for inputting a rotational speed of an engine and a battery voltage;

output means for outputting an output signal to control field current of a field coil;

control means for varying said output signal to allow said battery voltage to approach a control voltage;

first setting means for setting said control voltage to a predetermined steady state control voltage; and second setting means for setting said control voltage to an acceleration control voltage that is higher than said battery voltage by a predetermined voltage difference, said control voltage set higher than said battery voltage and less than said steady state control voltage during acceleration at low speeds with the rotational speed of the engine being equal to or less than a predetermined value and a rate of increase in said rotational speed being equal to or greater than a predetermined value.

21. A method for controlling a motor vehicle alternator wherein a rotational speed of an engine and a battery voltage are input, and field current is controlled to allow said battery voltage to approach a control voltage, said method comprising the steps of:

setting said control voltage to a predetermined steady state control voltage, and setting said control voltage to an acceleration control voltage that is higher than said battery voltage by a predetermined voltage difference, said control voltage set higher than said battery voltage and less than said steady state control voltage during acceleration at low speeds with the rotational speed of the engine being equal to or less than a predetermined value and a rate of increase in said rotational speed being equal to or greater than a predetermined value.

* * * * *